(12) United States Patent
Nakazawa

(10) Patent No.: US 7,997,665 B2
(45) Date of Patent: Aug. 16, 2011

(54) BRAKE CONTROL APPARATUS

(75) Inventor: Chiharu Nakazawa, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 1229 days.

(21) Appl. No.: 11/487,396

(22) Filed: Jul. 17, 2006

(65) Prior Publication Data

US 2007/0018498 A1 Jan. 25, 2007

(30) Foreign Application Priority Data

Jul. 19, 2005 (JP) ................................. 2005-208044

(51) Int. Cl.
*B60T 8/36* (2006.01)
*B60T 7/20* (2006.01)
(52) U.S. Cl. .......... 303/119.3; 303/DIG. 10; 188/112 R; 188/142; 188/153 A; 188/155
(58) Field of Classification Search ............... 303/119.3, 303/DIG. 10; 188/112 R, 142, 153 A
See application file for complete search history.

(56) References Cited

U.S. PATENT DOCUMENTS

| 5,407,260 | A | * | 4/1995 | Isshiki et al. | ................ | 303/119.3 |
| 5,634,695 | A | * | 6/1997 | Ohta et al. | ....................... | 303/10 |
| 6,439,673 | B2 | * | 8/2002 | Anderson | .................. | 303/119.3 |
| 2002/0149259 | A1 | * | 10/2002 | Otomo et al. | ..................... | 303/3 |
| 2002/0190572 | A1 | * | 12/2002 | Nakazawa | .................. | 303/116.4 |
| 2003/0155809 | A1 | * | 8/2003 | Schlitzkus et al. | ......... | 303/119.3 |
| 2004/0075337 | A1 | | 4/2004 | Giers et al. | | |
| 2004/0113488 | A1 | * | 6/2004 | Sekihara | ..................... | 303/119.3 |
| 2004/0207256 | A1 | * | 10/2004 | Volz | ........................... | 303/119.3 |

FOREIGN PATENT DOCUMENTS

| EP | 1 251 052 A2 | | 10/2002 |
| JP | 2000-168536 A | | 6/2000 |
| JP | 2003327108 A | * | 11/2003 |
| JP | 2004-330966 A | | 11/2004 |
| JP | 2004330966 | * | 11/2004 |

OTHER PUBLICATIONS

Official Communication; Nov. 27, 2007, 10 2006 033 493.0-21, Hitachi, Ltd.; EP 1 251 052 A2, the examination is based on claims 1 to 21.
Notification of First Office Action, Oct. 26, 2007, Hitachi, Ltd., Application No. 200610105598.6, *Brake Control Apparatus*.

* cited by examiner

*Primary Examiner* — Bradley T King
*Assistant Examiner* — Mahbubur Rashid
(74) *Attorney, Agent, or Firm* — Foley & Lardner LLP

(57) ABSTRACT

A brake control apparatus includes a brake unit. The brake unit includes: a first port set hydraulically connected to a master cylinder via a first fluid line set; a second port set hydraulically connected to a wheel cylinder set via a second fluid line set; a first fluid passage hydraulically connecting the first port set to the second port set; a first switching valve arranged to vary a state of fluid communication through the first fluid passage; a fluid pressure source arranged to produce a fluid pressure supplied to the second port set; a fluid accommodating section adapted to accommodate a variable amount of brake fluid; a branch fluid passage hydraulically connecting the first port set to the fluid accommodating section; and a second switching valve arranged to vary a state of fluid communication through the branch fluid passage.

5 Claims, 11 Drawing Sheets

BRAKE CONTROL APPARATUS

BACKGROUND OF THE INVENTION

The present invention relates generally to vehicle brake control, and more particularly to vehicle brake-by-wire control.

Japanese Patent Application Publication No. 2000-168536 shows a brake-by-wire system, henceforth referred to as "BBW system", which includes an accumulator for storing pressurized brake fluid and operates hydraulic brakes by supplying the pressurized brake fluid to wheel cylinders. Under normal operating conditions, the brake fluid pressure of the accumulator is kept as high as possible in order to quickly supply a hydraulic pressure needed to generate a desired braking force. This BBW system includes a stroke simulator for allowing a desired brake pedal stroke and further providing a simulated feel of brake pedal depression to the driver.

SUMMARY OF THE INVENTION

The BBW system of Japanese Patent Application Publication No. 200-168536 includes no power boosting device such as a vacuum power booster. This is effective for creating a space around the master cylinder. On the other hand, the stroke simulator is either formed integrally of a master cylinder or arranged close to a master cylinder. As a result, the vacant space created by removing conventional power boosting devices is occupied by the stroke simulator. This adversely affects compactness of the BBW system and flexibility of engine room layout.

Accordingly, it is an object of the present invention to provide a brake control apparatus which is effective for enhancing flexibility of engine room layout.

According to one aspect of the present invention, a brake control apparatus comprises: a master cylinder adapted to produce a fluid pressure in accordance with a state of a brake operating device; a wheel cylinder set adapted to produce a braking effort to a road wheel set of a vehicle in accordance with a fluid pressure; a brake unit; a first fluid line set hydraulically connecting the master cylinder to the brake unit; and a second fluid line set hydraulically connecting the wheel cylinder set to the brake unit, the brake unit comprising: a first port set hydraulically connected to the master cylinder via the first fluid line set; a second port set hydraulically connected to the wheel cylinder set via the second fluid line set; a first fluid passage hydraulically connecting the first port set to the second port set; a first switching valve arranged to vary a state of fluid communication through the first fluid passage; a fluid pressure source arranged to produce a fluid pressure supplied to the second port set; a fluid accommodating section adapted to accommodate a variable amount of brake fluid; a branch fluid passage hydraulically connecting the first port set to the fluid accommodating section; and a second switching valve arranged to vary a state of fluid communication through the branch fluid passage.

According to another aspect of the invention, a brake control apparatus comprises: a brake unit adapted to be arranged in a brake line system, the brake unit comprising: a first port set adapted to be hydraulically connected to an upstream portion of the brake line system via a first fluid line set; a second port set hydraulically connected to a downstream portion of the brake line system via a second fluid line set; a first fluid passage hydraulically connecting the first port set to the second port set; a first switching valve arranged to vary a state of fluid communication through the first fluid passage; a fluid pressure source arranged to produce a fluid pressure supplied to the second port set; a fluid accommodating section adapted to accommodate a variable amount of brake fluid; a branch fluid passage hydraulically connecting the first port set to the fluid accommodating section; and a second switching valve arranged to vary a state of fluid communication through the branch fluid passage; and a controller electrically connected to the first switching valve, the second switching valve, and the fluid pressure source, and configured to control the first switching valve, the second switching valve, and the fluid pressure source in accordance with a state of a brake operating device.

According to a further aspect of the invention, a brake control apparatus comprises: a master cylinder adapted to produce a fluid pressure in accordance with a state of a brake operating device; a wheel cylinder set adapted to produce a braking effort to a road wheel set of a vehicle in accordance with a fluid pressure; a brake unit; a first fluid line set hydraulically connecting the master cylinder to the brake unit; and a second fluid line set hydraulically connecting the wheel cylinder set to the brake unit, the brake unit comprising: a motor-driven fluid pressure source arranged to produce a fluid pressure supplied to the wheel cylinder set; and a fluid accommodating section arranged to accommodate a variable amount of brake fluid supplied from the master cylinder.

DETAILED DESCRIPTION OF THE INVENTION

Figure 1:
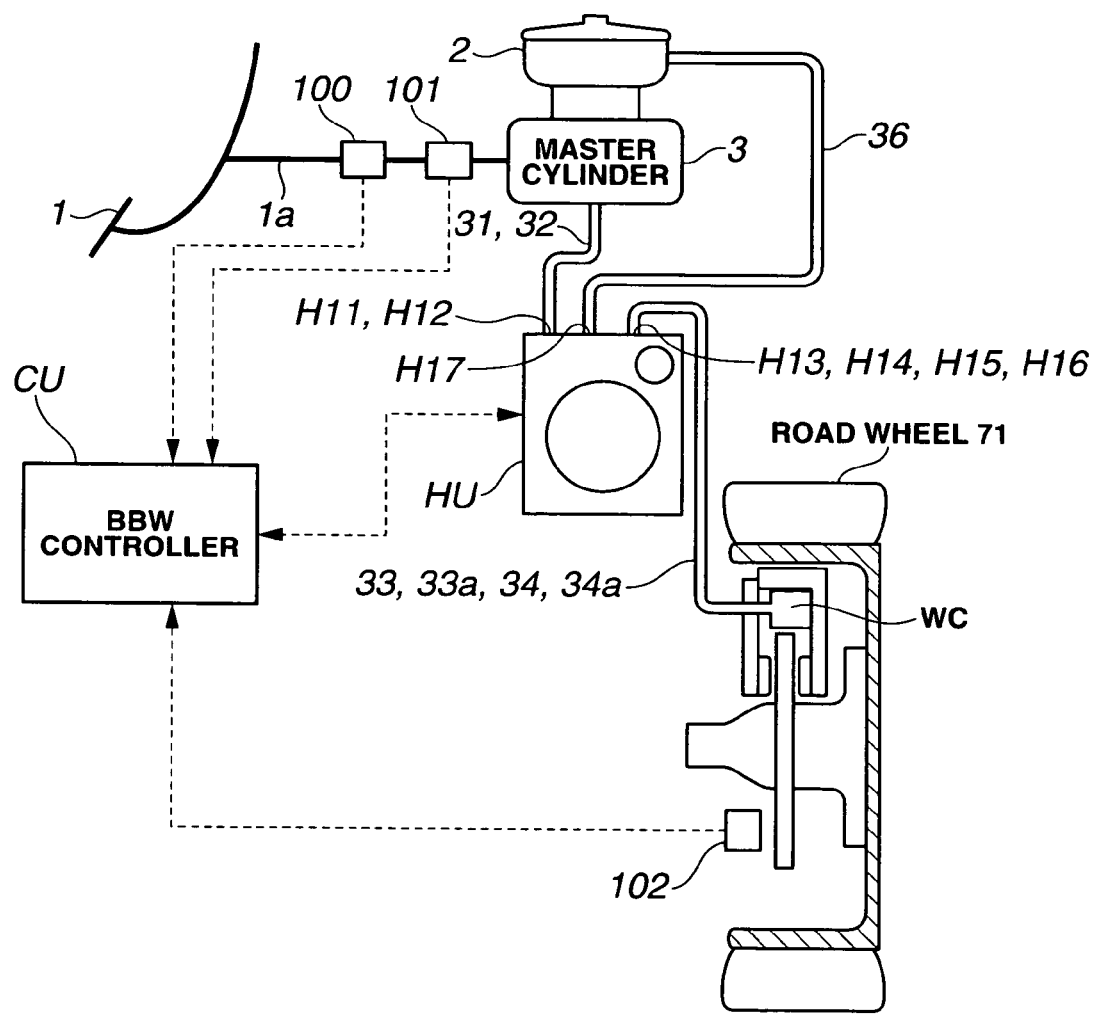
FIG. 1 is a schematic diagram showing system configuration of a BBW system with a brake control apparatus in accordance with a first embodiment.

The following describes a brake control apparatus in accordance with a first embodiment with reference to FIGS. 1 through 8. FIG. 1 is a schematic diagram showing system configuration of a BBW system with the brake control apparatus of the first embodiment. As shown in FIG. 1, a brake pedal 1 is adapted to be operated by a driver, and is coupled to a push rod 1a. Push rod 1a is coupled to a piston of a master cylinder 3, and is equipped with a brake pedal force sensor 100 configured to measure a driver's brake pedal force and a stroke sensor 101 configured to measure the amount of stroke of brake pedal 1.

As shown in FIG. 1, master cylinder 3 is formed integrally with a fluid reservoir tank 2, ensuring that push rod 1a stably travels even under condition that the needed amount of brake fluid fluctuates. Master cylinder 3 is of a tandem type, and is hydraulically connected to a hydraulic brake unit HU through fluid passages 31 and 32 as a fluid line set for master cylinder. Fluid reservoir tank 2 is hydraulically connected to hydraulic brake unit HU through a fluid passage 36 as a fluid line set for fluid reservoir tank, serving to supply brake fluid to a gear pump 10 as a fluid pressure source, and to recirculate brake fluid to fluid reservoir tank 2 during pressure reduction of a wheel cylinder set WC. Hydraulic brake unit HU is hydraulically connected to wheel cylinder set WC through fluid passages 33, 33a, 34 and 34a as a fluid line set for wheel cylinder. Wheel cylinder set WC consists of four wheel cylinders each of which generates a braking effort or torque or force to a respective one of road wheels 71.

Hydraulic brake unit HU is formed with a first port set H11 and H12 to which fluid passages 31 and 32 for master cylinder 3 are connected, a second port set H13, H14, H15 and H16 to which fluid passages 33, 33a, 34 and 34a for wheel cylinder set WC are connected, and a third port set H17 to which fluid passage 36 for fluid reservoir tank 2 is connected.

As shown in FIG. 1, a BBW controller CU is electrically connected to brake pedal force sensor 100, stroke sensor 101, a wheel speed sensor 102 configured to measure rotational speed of each road wheel 71, and hydraulic brake unit HU. BBW controller CU is configured to receive sensor signals indicative of the brake pedal force, the brake pedal stroke, and the rotational speed of each road wheel, and sensor signals from fluid pressure sensors installed in hydraulic brake unit HU, and configured to control electromagnetic valves and an electric motor 50 which are installed in hydraulic brake unit HU. The fluid pressure sensors and electromagnetic valves are described below in detail.

Figure 2:
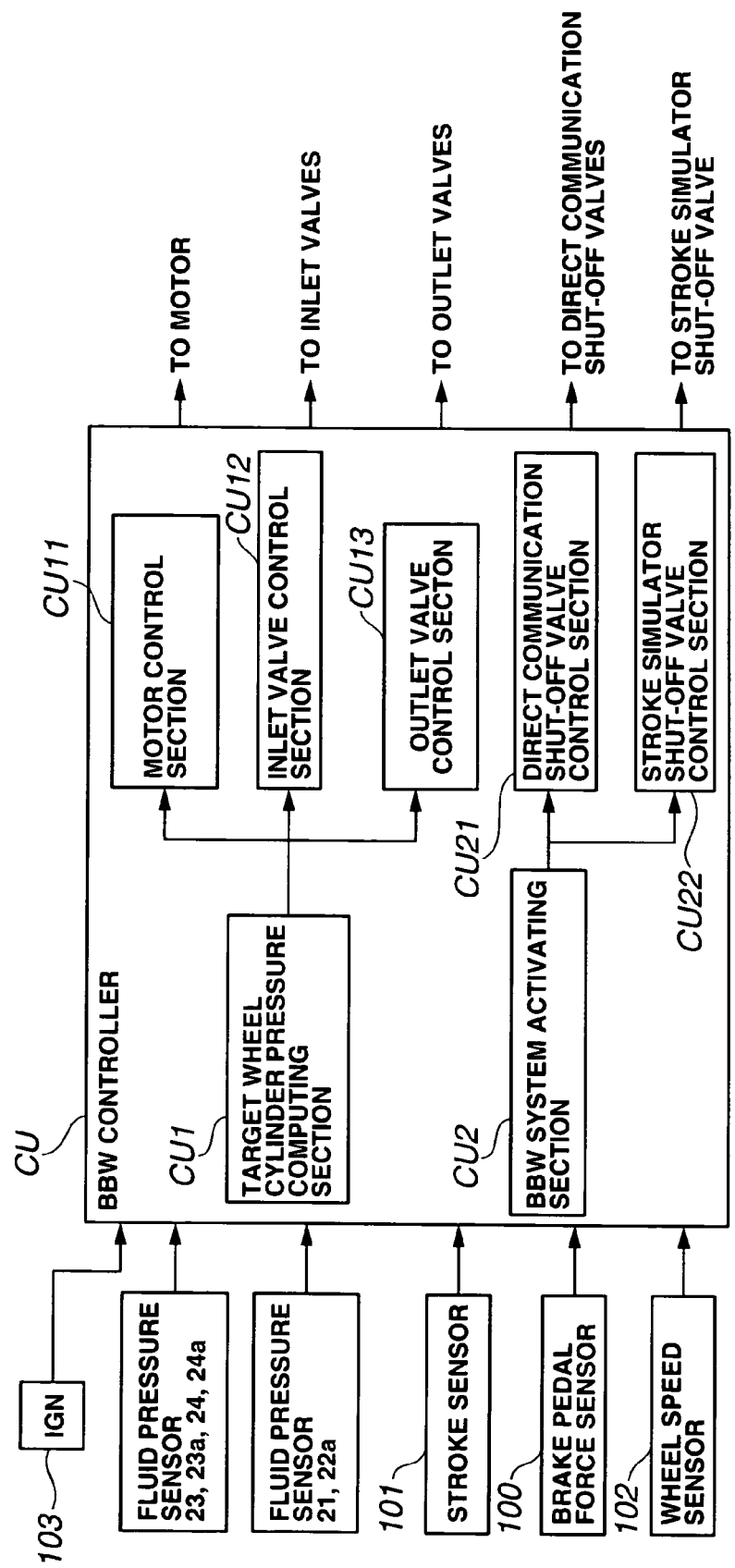
FIG. 2 is a block diagram showing system configuration of a BBW controller of the brake control apparatus of the first embodiment.

FIG. 2 is a block diagram showing system configuration of BBW controller CU. As shown in FIG. 2, BBW controller CU comprises a target wheel cylinder pressure computing section CU1, a BBW system activating section CU2, a motor control section CU11, an inlet valve control section CU12, an outlet valve control section CU13, a direct communication shut-off valve control section CU21, and a stroke simulator shut-off valve control section CU22. Target wheel cylinder pressure computing section CU1 computes a target wheel cylinder pressure in accordance with a state of driver's braking operation which is determined or measured by brake pedal force sensor 100, stroke sensor 101, etc. BBW system activating section CU2 determines whether to activate the BBW system in accordance with an ignition signal from an ignition switch 103.

After computing the target wheel cylinder pressure, target wheel cylinder pressure computing section CU1 issues and outputs command signals to motor control section CU11, inlet valve control section CU12, and outlet valve control section CU13. Motor control section CU11 controls an operating state of motor 50 to drive a gear pump 10. Inlet valve control section CU12 controls the opening state of below-mentioned inlet valves 13, 13a, 14 and 14a, while outlet valve control section CU13 controls the opening state of below-mentioned outlet valves 15, 15a, 16 and 16a.

After determining to activate the BBW system, BBW system activating section CU2 issues and outputs command signals to direct communication shut-off valve control section CU21 and stroke simulator shut-off valve control section CU22. Direct communication shut-off valve control section CU21 controls the opening state of below-mentioned direct communication shut-off valves 11 and 12, while stroke simulator shut-off valve control section CU22 controls the opening state of a below-mentioned stroke simulator shut-off valve S1. Although BBW system activating section CU2 determines whether to activate the BBW system in accordance with the state of ignition switch is 103 as mentioned above, BBW system activating section CU2 may be configured to determine whether to activate the BBW system in accordance with a brake switch signal, or a door-lock cancellation signal. Although stroke simulator shut-off valve control section CU22 operates basically in accordance with the command signal issued by BBW system activating section CU2, stroke simulator shut-off valve control section CU22 may be controlled by other control sections.

Figure 3:
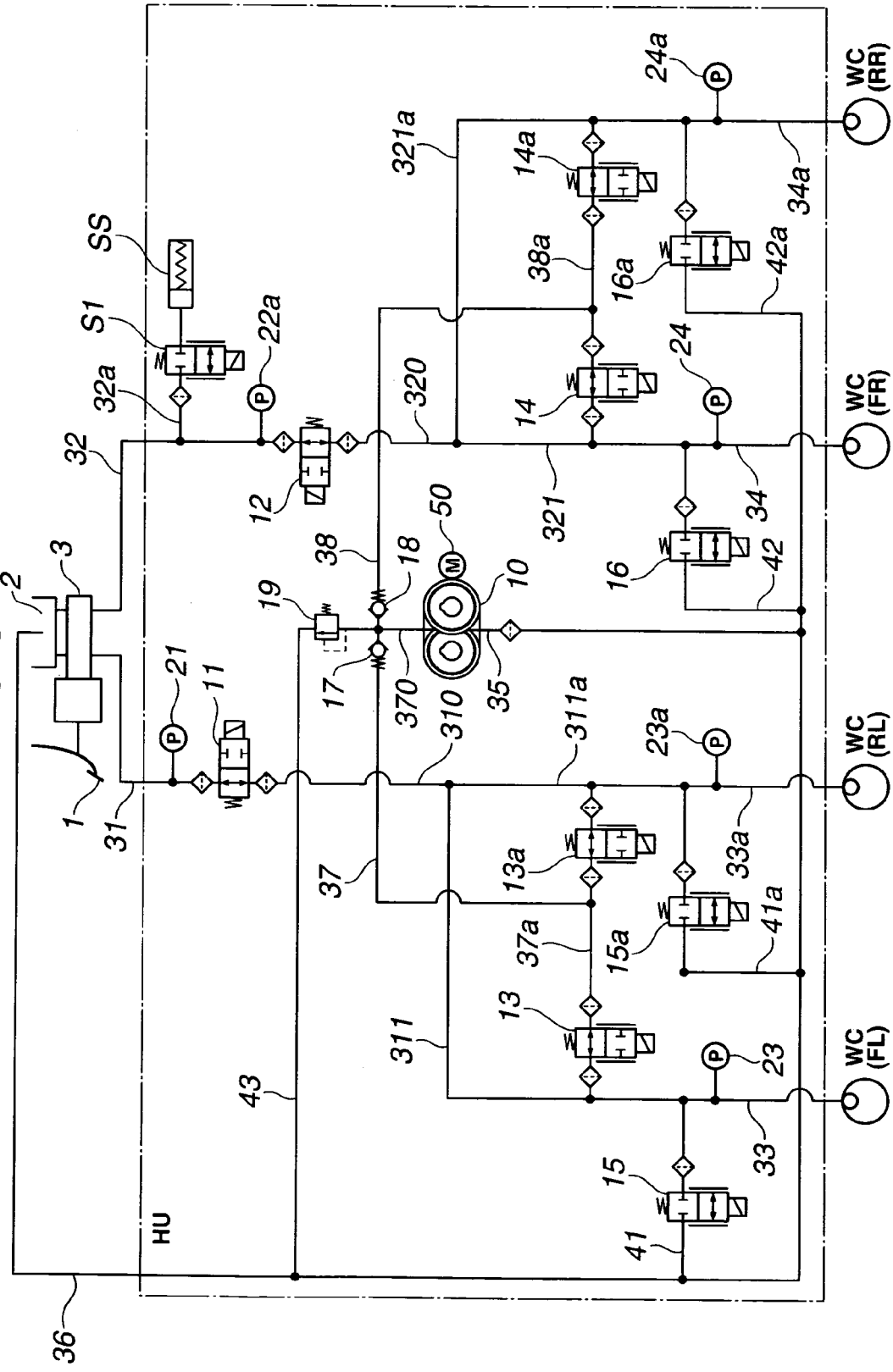
FIG. 3 is a schematic circuit diagram showing a hydraulic circuit of the brake control apparatus of the first embodiment.

FIG. 3 is a schematic circuit diagram showing the hydraulic circuit of hydraulic brake unit HU. As shown in FIG. 3, wheel cylinder set WC includes four wheel cylinders FL, RL, FR and RR. Front left wheel cylinder FL is hydraulically connected to master cylinder 3 via fluid passages 33, 311, 310 and 31. Front right wheel cylinder FR is hydraulically connected to master cylinder 3 via fluid passages 34, 321, 320 and 32. Rear left wheel cylinder RL is hydraulically connected to master cylinder 3 via fluid passages 33a, 311a, 310 and 31. Rear right wheel cylinder RR is hydraulically connected to master cylinder 3 via fluid passages 34a, 321a, 320 and 32.

Direct communication shut-off valves 11 and 12 are provided in fluid passages 31 and 32, respectively. Direct communication shut-off valves 11 and 12 are of a normally-open type, namely, are closed while energized under normal braking conditions, and opened while de-energized. Accordingly, when a malfunction is present in the electrical system, direct communication shut-off valves 11 and 12 automatically opens and provides direct fluid communication between master cylinder 3 and wheel cylinder set WC, thus providing a manual braking system. A branch fluid passage 32a is provided in fluid passage 32 between master cylinder 3 and direct communication shut-off valve 12. A stroke simulator SS is hydraulically connected to branch fluid passage 32a via a stroke simulator shut-off valve S1 of a normally-closed type. Stroke simulator SS receives and stores brake fluid supplied from master cylinder 3.

As shown in FIG. 3, stroke simulator SS is mounted within hydraulic brake unit HU, not located near master cylinder 3. On the other hand, since the brake control apparatus of the first embodiment includes no accumulator, stroke simulator SS is installed in the space for accumulator. As a result, a space is produced around master cylinder 3. The above construction of hydraulic brake unit HU allows master cylinder 3 to be of a conventional type, serving for cost reduction. Stroke simulator SS is described below in detail.

A fluid pressure sensor 21 is disposed in fluid passage 31, while a fluid pressure sensor 22a is disposed in fluid passage 32. Further, fluid pressure sensors 23, 23a, 24 and 24a are disposed in fluid passages 33, 33a, 34 and 34a, respectively.

Gear pump 10 is disposed between a pump inlet fluid passage 35 and a pump outlet fluid passage 370. Pump inlet fluid passage 35 is hydraulically connected to fluid reservoir tank 2 via fluid passage 36, while pump outlet fluid passage 370 is hydraulically connected to fluid passages 43 and 36 via a pressure relief valve 19 and connected to fluid passages 37 and 38 via check valves 17 and 18 which prevent inverse flow of brake fluid.

Fluid passage 37 is hydraulically connected at its downstream end to a fluid passage 37a. In fluid passage 37a are provided inlet valves 13 and 13a of a normally open linear type. Fluid passage 37a is hydraulically connected at one end to a fluid passage 311 via inlet valve 13, and connected at the other end to a fluid passage 311a via inlet valve 13a. Similarly fluid passage 38 is connected at its downstream end to a fluid passage 38a. In fluid passage 38a are provided inlet valves 14 and 14a of a normally open linear type. Fluid passage 38a is hydraulically connected at one end to a fluid passage 321 via inlet valve 14, and connected at the other end to a fluid passage 321a via inlet valve 14a.

The point hydraulically connecting fluid passages 311 and 33 is also hydraulically connected to one end of a fluid passage 41 which is hydraulically connected at the other end to fluid passage 36. In fluid passage 41 is provided an outlet valve 15 of a normally closed linear type. The point hydraulically connecting fluid passages 311a and 33a is also hydraulically connected to one end of a fluid passage 41a which is hydraulically connected at the other end to fluid passage 36. In fluid passage 41a is provided an outlet valve 15a of a normally closed linear type. The point hydraulically connecting fluid passages 321 and 34 is also hydraulically connected to one end of a fluid passage 42 which is hydraulically connected at the other end to fluid passage 36. In fluid passage 42 is provided an outlet valve 16 of a normally closed linear type. The point hydraulically connecting fluid passages 321a and 34a is also hydraulically connected to one end of a fluid passage 42a which is hydraulically connected at the other end to fluid passage 36. In fluid passage 42a is provided an outlet valve 16a of a normally closed linear type.

Although hydraulic brake unit HU is configured to include one housing, one pump and a plurality of valves, and to supply brake fluid to four wheel cylinders as mentioned above, hydraulic brake unit HU may be provided for each of a first set of front left and right wheel cylinders FL and FR and a second set of rear left and right wheel cylinders RL and RR while stroke simulator SS may be applied to one of hydraulic brake units HU and HU. Alternatively, hydraulic brake unit HU may be configured to control one of the two wheel sets while the other wheel set may be controlled by an electronic brake.

The following describes a normal control mode where the BBW control is carried out. Since the brake control apparatus is configured symmetrically, the following description deals with the construction concerning the left front and rear road wheels. When the BBW system is activated, stroke simulator shut-off valve S1 is opened while direct communication shut-off valves 11 and 12 are closed. When brake pedal 1 is depressed down, the brake fluid is supplied from master cylinder 3 via fluid passage 32 and branch fluid passage 32a and stroke simulator shut-off valve S1 to stroke simulator SS. The operation of stroke simulator SS is described below. The target wheel cylinder pressure is computed in accordance with the measured stroke and force of brake pedal 1, and a corresponding amount of electric current is supplied to motor 50.

While gear pump 10 is driven, a brake fluid pressure is supplied to fluid passage 37a via check valve 17 and fluid passage 37. The brake fluid pressure is supplied from fluid passage 37a via inlet valves 13 and 13a and fluid passages 33 and 33a to front left wheel cylinder FL and rear left wheel cylinder RL so that the brake fluid pressure of each of wheel cylinder set WC is increased to a desired pressure. On the other hand, when gear pump 10 is stopped and outlet valves 15 and 15a are opened, the brake pressure of wheel cylinder set WC is reduced or released via fluid passages 41 and 41a and fluid passage 36 to fluid reservoir tank 2.

In case a malfunction is present in the electrical system so that all the electromagnetic valves are de-energized, stroke simulator shut-off valve S1 is closed while direct communication shut-off valves 11 and 12 are opened. When brake pedal 1 is depressed down, the brake fluid pressure of master cylinder 3 is supplied directly to front left wheel cylinder FL via fluid passages 31, 310, 311 and 33 and to rear left wheel cylinder RL via fluid passages 31, 310, 311a and 33a. The brake fluid pressure is thus supplied only via direct communication shut-off valves 11 and 12, and can be generated even by a small brake pedal force. It is noted that when inlet valves 13 and 13a are opened, fluid passages 37a and 37 and check valve 17 provide a closed circuit.

Figure 4:
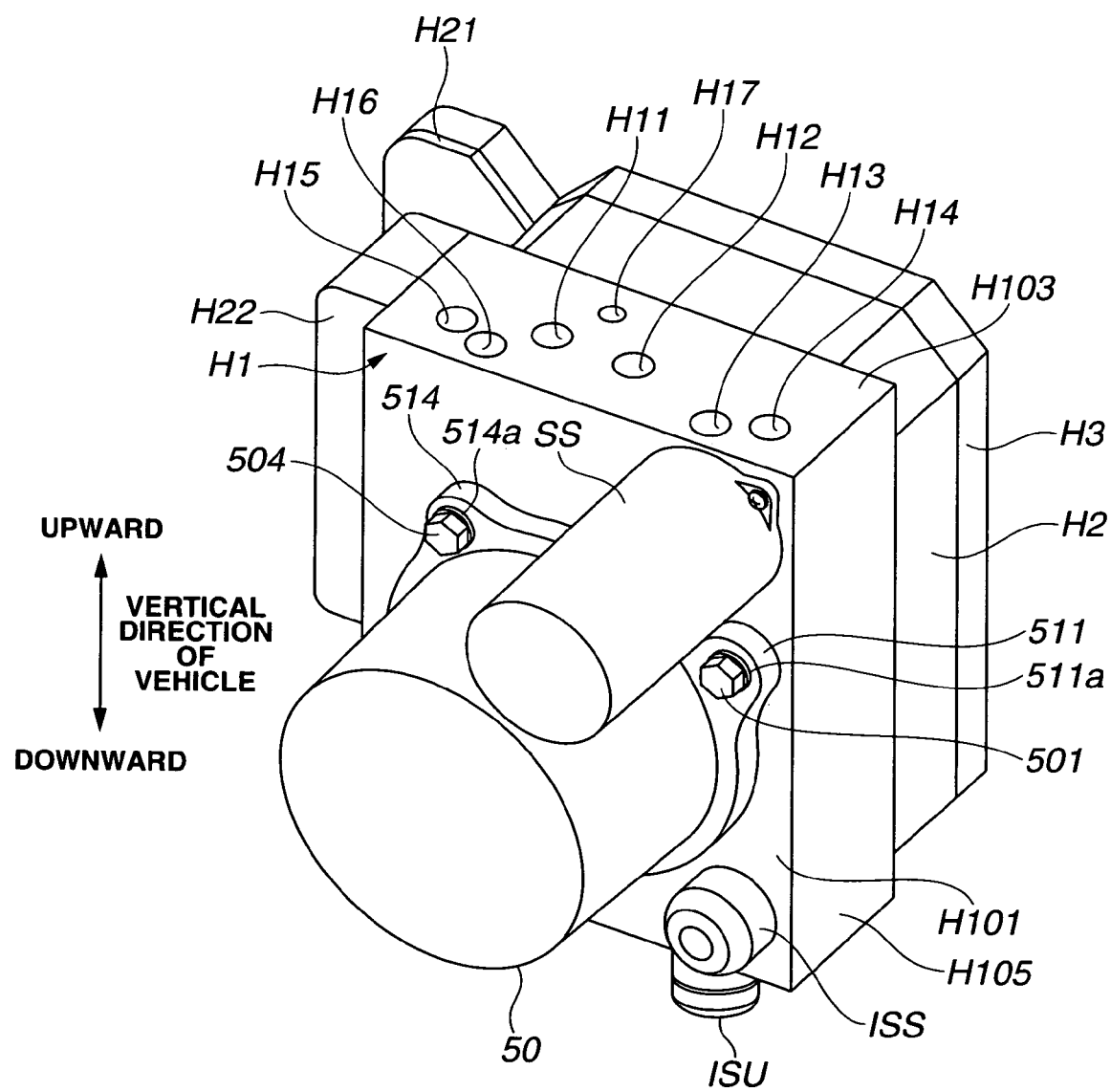
FIG. 4 is a perspective view of a hydraulic brake unit of the brake control apparatus of the first embodiment.
Figure 5:
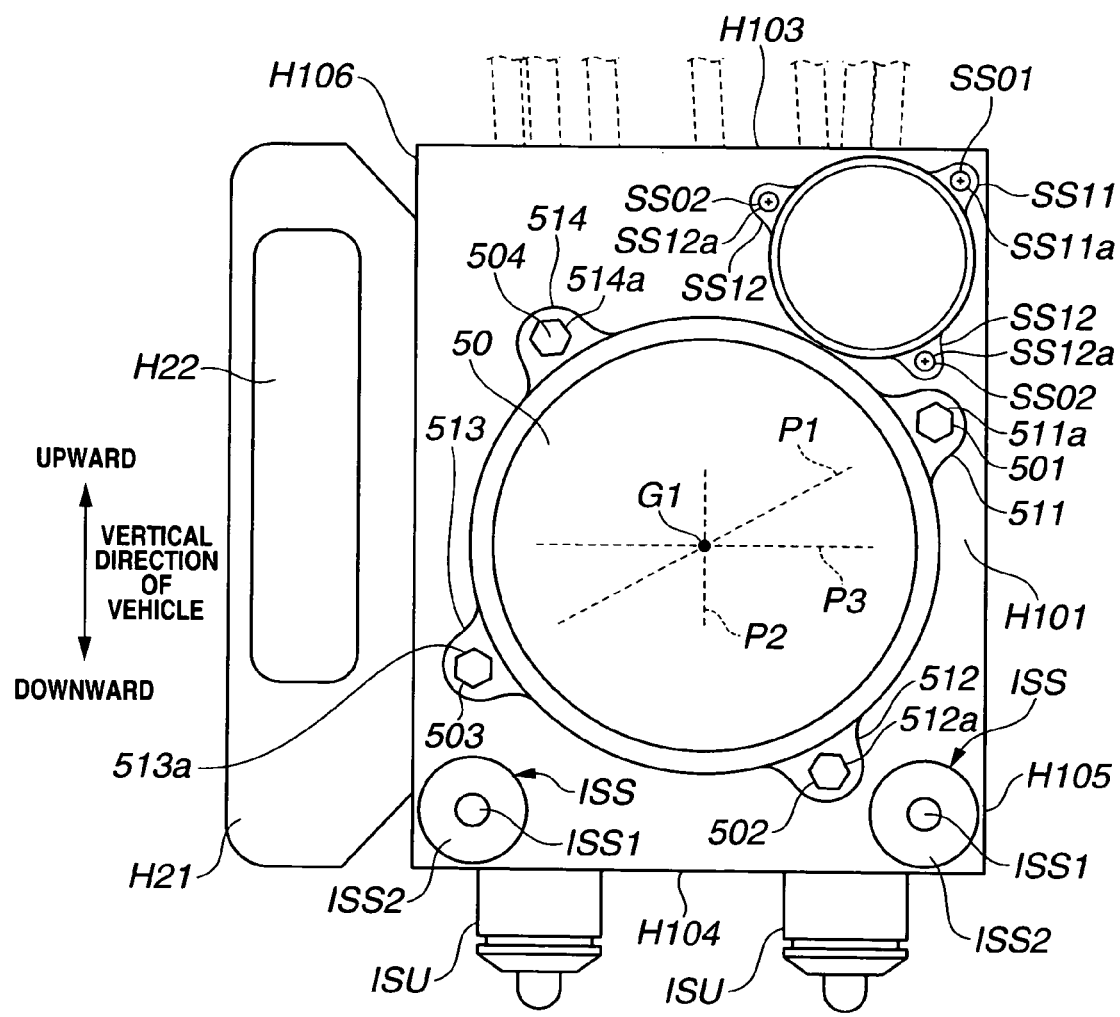
FIG. 5 is a front view of the hydraulic brake unit of the first embodiment.
Figure 6:
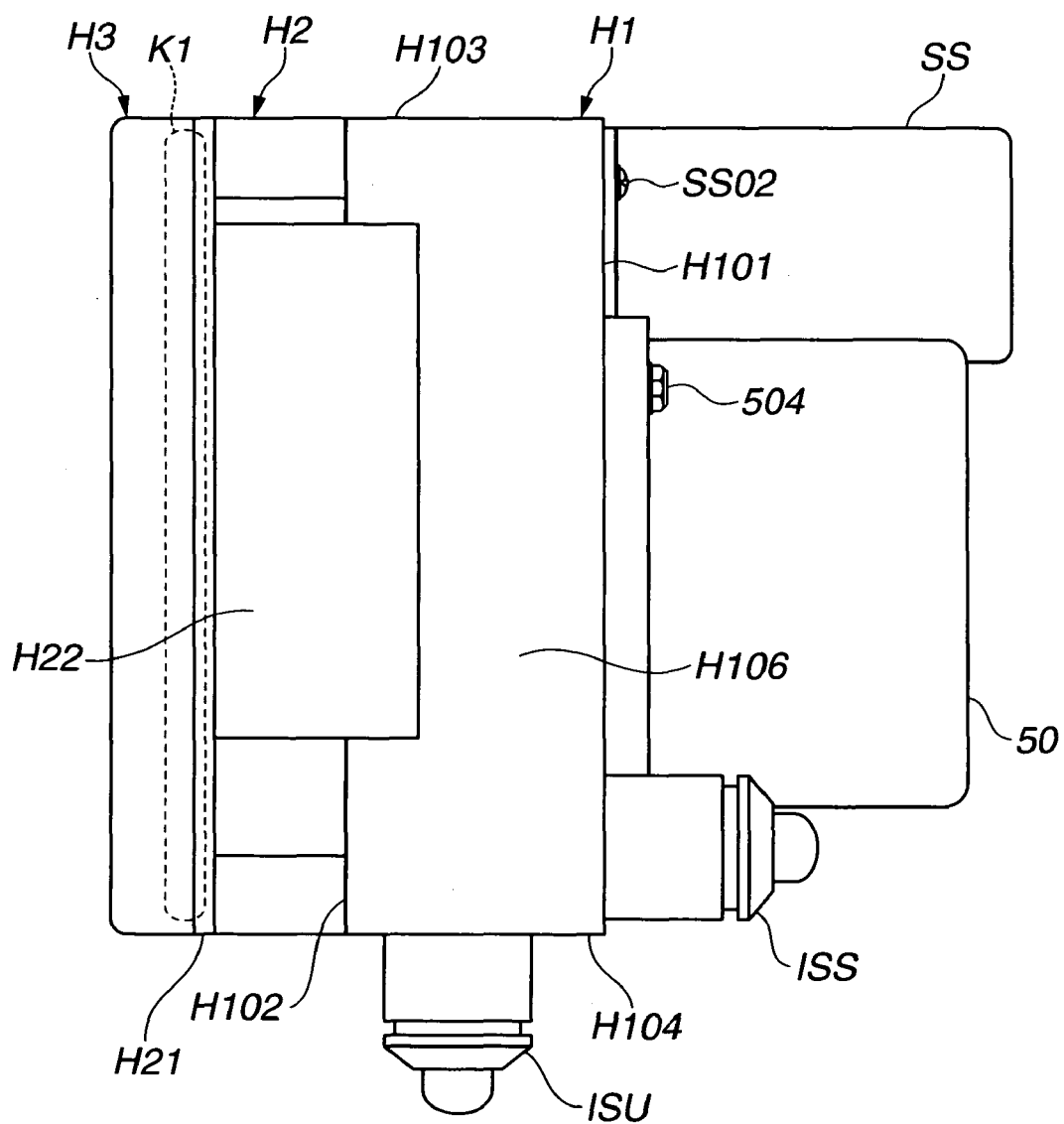
FIG. 6 is a side view of the hydraulic brake unit of the first embodiment.
Figure 7:
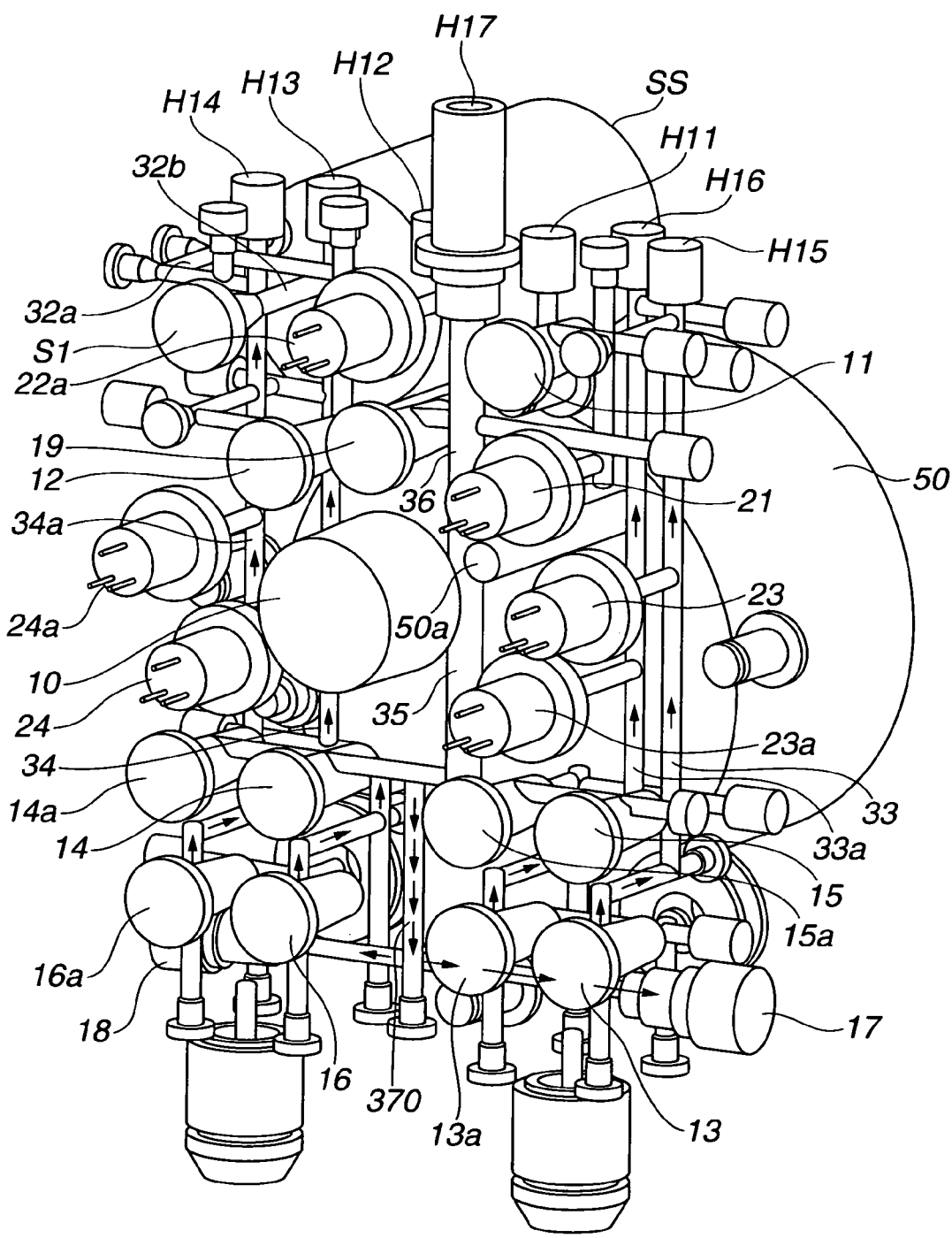
FIG. 7 is a cutaway perspective view of the hydraulic brake unit of the first embodiment, showing electrical components and fluid passages arranged in a first unit of the hydraulic brake unit.
Figure 8:
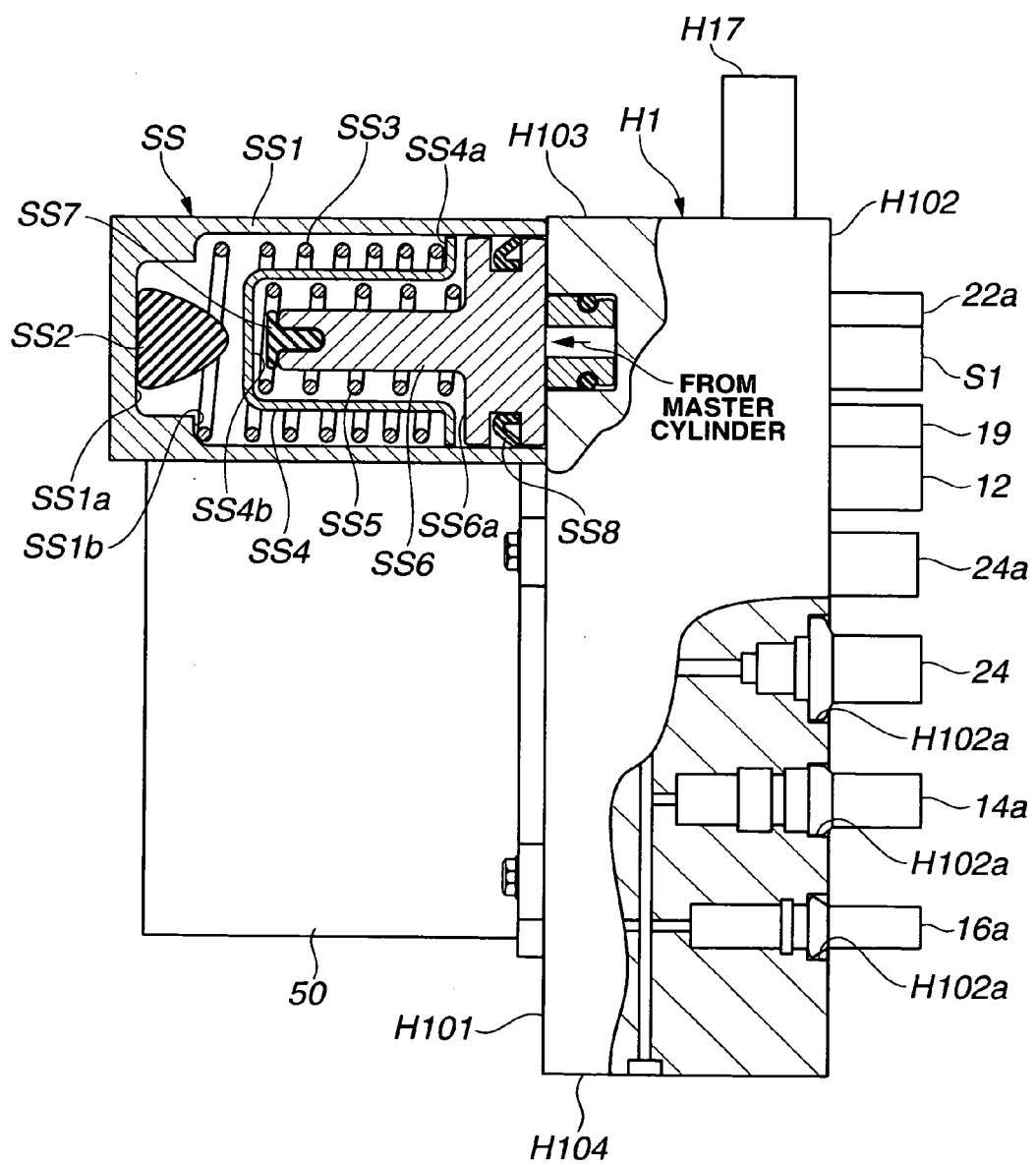
FIG. 8 is a cutaway side view of the hydraulic brake unit of the first embodiment.

FIG. 4 is a perspective view of hydraulic brake unit HU. FIG. 5 is a front view of hydraulic brake unit HU. FIG. 6 is a side view of hydraulic brake unit HU. FIG. 7 is a cutaway perspective view of hydraulic brake unit HU, showing electrical components and fluid passages arranged in a first unit H1 of hydraulic brake unit HU. FIG. 8 is a cutaway side view of hydraulic brake unit HU. As shown in FIG. 4, hydraulic brake unit HU comprises first unit H1, a second unit H2, and a third unit H3. First unit H1 is formed of an aluminum block, having a first lateral face H101 where motor 50 and stroke simulator SS are mounted, a second lateral face H102 which is opposed to first lateral face H101, a top face H103 where brake lines are connected, a bottom face H104 where bottom insulators ISU are mounted, a third lateral face H105 near which stroke simulator SS is located, and a fourth lateral face H106 where a connector port H22 of second unit H2 is provided.

First lateral face H101 of first unit H1 includes portions for retaining motor 50, stroke simulator SS, and lateral insulator ISS. As shown in FIG. 5, motor 50 includes portions 511, 512, 513 and 514 around its periphery which define mounting holes 511a, 512a, 513a and 514a for receiving bolts 501, 502, 503 and 504, and which are arranged around the periphery and substantially evenly spaced. Motor 50 is mounted in such a manner that a straight line P1 connecting mounting holes 511a and 513a is offset in angle from a horizontal straight line P3. This arrangement is effective for maximizing portions 511, 512, 513 and 514 for a given area of first lateral face H101.

As shown in FIG. 5, a lower part of first lateral face H101 includes portions each retaining a lateral insulator ISS near both left and right ends. Lateral insulator ISS comprises a retaining shaft ISS1 and an insulating rubber ISS2. Retaining shaft ISS1 is extending in parallel with the motor axis G1 perpendicularly to first lateral face H101, serving as a mounting bracket to be secured to a vehicle body. Insulating rubber ISS2 is formed of an elastic element surrounding the periphery of retaining shaft ISS1. The bottom face of insulating rubber ISS2 is in direct contact with first lateral face H101, thus serving to reduce vibrations effectively.

As shown in FIG. 5, stroke simulator SS is cylindrically formed, located above with respect to a horizontal straight line P3 passing through motor axis G1, and displaced rightward with respect to a vertical straight line P2 passing through the motor axis G1. This positioning of stroke simulator SS is effective for utilizing the remaining area that is left after disposing motor 50 on the rectangular area of first lateral face H101.

As shown in the cutaway side view of FIG. 8, stroke simulator SS comprises an outer tube SS1, a first rubber member SS2, a first coil spring SS3, an inner tube SS4, a second coil spring SS5, a piston SS6, a second rubber member SS7, and a sealing member SS8. Outer tube SS1 is cylindrically formed, having a closed end SS1a and an open end secured to first unit H1. First rubber member SS2 is formed substantially in the shape of a cone with a bottom face secured to bottom face SS1a of outer tube SS1. First coil spring SS3 is disposed between a spring seat portion SS1*b* of outer tube SS1 and a spring seat portion SS4*a* of inner tube SS4. Second coil spring is SS5 is disposed between bottom face SS4*b* of inner tube SS4 and a flange portion SS6*a* of piston SS6. Second rubber member SS7 is secured to the tip of piston SS6. Sealing member SS8 is retained in an outer peripheral groove of piston SS6 and is in sliding contact with the inner face of outer tube SS1, serving to seal therebetween.

When brake fluid is supplied from master cylinder 3 to stroke simulator SS in response to depression of brake pedal 1, the brake fluid presses the bottom face of piston SS6 so that piston SS6 moves against the elastic force of second coil spring SS5 in the leftward direction of FIG. 8. When second rubber member SS7 located at the tip of piston SS6 reaches bottom face SS4*b* of inner tube SS4, piston SS6 and inner tube SS4 start to move leftward as a unit against the elastic force of first coil spring SS3. When inner tube SS4 reaches first rubber member SS2, inner tube SS4 starts to compress first rubber member SS2. The elastic force between inner tube SS4 and first rubber member SS2 simulates a feedback force for depressing brake pedal 1. This braking feel may be adjusted by varying the elasticity of elastic components. In this embodiment, the two coil springs have different coefficients of elasticity so that the feedback force varies in accordance with the amount of stroke of brake pedal 1. Specifically, stroke simulator SS is configured to increase the feedback force with increasing amount of depression of brake pedal 1. Stroke simulator SS operates similarly as described in Japanese Patent Application Publication No. 2004-330966. The entire contents of this Japanese Patent Application No. 2004-330966 are hereby incorporated by reference. Stroke simulator SS may include a position adjusting mechanism with which a driver can adjust the amount of compression of the installed coil springs by means of an adjusting thread to adjust the feedback force with respect to brake pedal depression to obtain a desired braking feel.

As shown in FIG. 8, second lateral face H102 of first unit H1, which is opposed to first lateral face H101, is formed with a plurality of mounting holes H102*a* adapted to fasten electrical components, namely the inlet valves, the outlet valves, and the fluid pressure sensors. These electrical components are each inserted into mounting hole H102*a*, and then secured by swaging the periphery of mounting hole H102*a*. Instead of swaging, the electrical components may be secured by press-fitting, bolting, etc. Stroke simulator shut-off valve S1 is mounted in a position on second lateral face H102 which is opposed to stroke simulator SS, that is, mounted on a point of second lateral face H102 where stroke simulator SS is orthogonally projected on second lateral face H102.

Second unit H2 is secured to second lateral face H102 of first unit H1, covering the above electrical components. As shown in FIG. 5, second unit H2 comprises a connector retainer portion H21 and a connector port H22 supported on connector retainer portion H21. Connector port H22 is connected to a connector collecting power supply lines, sensor signal lines, CAN (Controller Area Network) communication lines, etc. Under condition that hydraulic brake unit HU is mounted on a vehicle, the top portion of hydraulic brake unit HU is connected to the fluid lines, the bottom portion and front portion are occupied by the mounting brackets, the motor, etc., and the electrical lines are drawn collectively via connector port H22 located on the side portion. Since connector retainer portion H21 and connector port H22 are provided on the side face farer from stroke simulator SS, it is easy to establish the line connection without interference.

As shown in FIG. 6, second unit H2 of stroke simulator SS includes a portion for retaining a circuit board K1. Circuit board K1 is electrically connected to motor 50, the fluid pressure sensors, and the coils of the electromagnetic valves. Circuit board K1 includes portions for mounting CPU, ROM, RAM, etc., serving as BBW controller CU. This arrangement where the electrical components are disposed on one side face is effective for simplifying the wiring and enhancing the ease of installation.

Third unit H3 of hydraulic brake unit HU serves as a cover member to sandwich second unit H2 with first unit H1, sealingly covering the back face of second unit H2. The following describes a process of assembling hydraulic brake unit HU. First, first unit H1 is constructed by forming the fluid passages and mounting holes in a rectangular aluminum block by drilling. Second, the electrical components are installed and secured by swaging on second lateral face H102 of first unit H1. This swaging process is stably carried out since at the time first lateral face H101 opposed to second lateral face H102 is a flat surface and is in stable contact with a workbench. Third, motor 50 and stroke simulator SS are installed onto first unit H1. Fourth, second unit H2 is coupled to first unit H1 to cover the electrical components, and the electrical components are electrically coupled to associated portions of circuit board K1. The electrical coupling may be implemented by soldered connection between projecting contacts of the electrical components and circuit board K1, or by fitting the contacts into female connectors of circuit board K1. In case of soldered connection, the connecting process is easily carried out on the rear face of second unit H2 adapted for third unit H3. Fifth, third unit H3 is coupled to second unit H2, to complete the construction of hydraulic brake unit HU. The provision of third unit H3 is effective for enhancing the ease of assembling of hydraulic brake unit HU.

As shown in FIG. 4, top face H103 of first unit H1 is formed with a plurality of ports H11, H12, H13, H14, H15 and H16 adapted to be connected to brake lines. First port set H11 and H12, which is formed substantially in the center of top face H103, is connected to fluid passages 31 and 32 for master cylinder 3. Second port set H13, H14, H15 and H16, which is formed sandwiching first port set H11 and H12, is connected to fluid passages 33, 33*a*, 34 and 34*a* for wheel cylinder set WC. Third port set H17, which is formed in the center of top face H103, is connected to fluid passage 36 for fluid reservoir tank 2. These ports and brake lines are arranged symmetrically with respect to port H17 and fluid passage 36.

As shown in the cutaway perspective view of FIG. 7, port H12 of first port set H11 and H12 is formed with a horizontal hole 32*b* closer to top face H103, horizontal hole 32*b* hydraulically connected to stroke simulator SS and stroke simulator shut-off valve S1. That is, stroke simulator SS is mounted on a point of first lateral face H101 where stroke simulator shut-off valve S1 is orthogonally projected on first lateral face H101. Branch fluid passage 32*a* which is hydraulically connected to port H12 and horizontal hole 32*b* is provided substantially at the same height as horizontal hole 32*b*. This arrangement minimizes the fluid resistance in the associated lines. Fluid sensors 21 and 22*a* are provided near first port set H11 and H12. Two pump outlet passages are formed, in which one is extending from below the bottom of the pump housing to check valves 17 and 18, and the other is extending via pressure relief valve 19 located above the pump housing to third port set H17. Check valves 17 and 18 are hydraulically connected via vertical lines to inlet valves 13, 13*a*, 14 and 14*a* and hydraulically connected via vertical lines to second port set H13, H14, H15 and H16. The vertical lines to second port set H13, H14, H15 and H16 are branched into vertical lines 33, 33*a*, 34 and 34*a*. The branch lines, 33, 33*a*, 34 and 34*a* are formed with fluid pressure sensors 23, 23*a*, 24 and 24*a*, and outlet valves 15, 15a, 16 and 16a. The outlets of outlet valves 15, 15a, 16 and 16a are hydraulically connected to each other by means of a horizontal line, which intersects with fluid passage 36 hydraulically connected to fluid reservoir tank 2.

The brake control apparatus of the first embodiment produces the following effects and advantages. (i) The brake control apparatus comprises: a master cylinder (3) adapted to produce a fluid pressure in accordance with a state of a brake operating device (1); a is wheel cylinder set (WC) adapted to produce a braking effort to a road wheel set (71) of a vehicle in accordance with a fluid pressure; a brake unit (HU); a first fluid line set (31, 32) hydraulically connecting the master cylinder (3) to the brake unit (HU); and a second fluid line set (33, 33a, 34, 34a) hydraulically connecting the wheel cylinder set (WC) to the brake unit (HU), the brake unit (HU) comprising: a first port set (H11, H12) hydraulically connected to the master cylinder (3) via the first fluid line set (31, 32); a second port set (H13, H14, H15, H16) hydraulically connected to the wheel cylinder set (WC) via the second fluid line set (33, 33a, 34, 34a); a first fluid passage (32, 320, 321) hydraulically connecting the first port set (H11, H12) to the second port set (H13, H14, H15, H16); a first switching valve (11, 12) arranged to vary a state of fluid communication through the first fluid passage (32, 320, 321); a fluid pressure source (50, 10, 370, 38, 38a) arranged to produce a fluid pressure supplied to the second port set (H13, H14, H15, H16); a fluid accommodating section (SS) adapted to accommodate a variable amount of brake fluid; a branch fluid passage (32a) hydraulically connecting the first port set (H11, H12) to the fluid accommodating section (SS); and a second switching valve (S1) arranged to vary a state of fluid communication through the branch fluid passage (32a). The arrangement where stroke simulator SS is disposed within hydraulic brake unit HU, is effective for enhancing compactness of a master cylinder unit including a master cylinder and accompanying components around the master cylinder, resulting in enhancing the degree of freedom of engine room layout. The brake control apparatus may use a conventional master cylinder, resulting in reduction of the manufacturing cost of the BBW system.

(ii) In the brake control apparatus, the fluid pressure source (50, 10, 370, 38, 38a) comprises: a motor (50); and a pump (10) driven by the motor (50) to produce a fluid pressure in the portion of the first fluid passage (32, 320, 321) between the first switching valve (11, 12) and the second port set (H13, H14, H15, H16), and the brake unit (HU) includes a first lateral face (H101) where the motor (50) and the fluid accommodating section (SS) are mounted. The brake control apparatus uses a motor-driven gear pump instead of such an accumulator as conventionally used. A typical accumulator is formed having a suitable strength and safety in order to store a high pressure constantly, resulting in large dimensions of the accumulator. The space left after removing an accumulator is available to arrange a stroke simulator, resulting in enhancing compactness of the master cylinder unit.

(iii) In the brake control apparatus, the brake unit (HU) further comprises a circuit board (K1) electrically connected to the motor (50), the first switching valve (11, 12), and the second switching valve (S1), and the brake unit (HU) includes a second lateral face (H102) opposed to the first lateral face (H101) where the first switching valve (11, 12), the second switching valve (S1), and the circuit board (K1) are mounted. The arrangement where circuit board K1 and the electrical components which are electrically connected to each other are disposed is collectively on one face, is effective for easily carrying out assembling processes such as soldering. The arrangement where the electrical components are arranged close to circuit board K1, is effective for easily performing wiring of electric lines and minimizing the energy loss due to the wiring. It is supposed here that the electromagnetic valves and fluid pressure sensors are mounted on the face that stroke simulator SS and motor 50 are mounted. When stroke simulator SS or motor 50 is mounted first, it is difficult to mount the electromagnetic valves and fluid pressure sensors by press-fitting or swaging. On the other hand, it is supposed here that in order to avoid this difficulty, stroke simulator SS and motor 50 are mounted or bolted after the process of press-fitting and swaging. It is however possible that the process of press-fitting and swaging causes a deformation of first unit H1 and causes a deformation of the mounting holes. This adversely affects the manufacturing efficiency. In contrast, in this embodiment, the arrangement where the electromagnetic valves and fluid pressure sensors are mounted on another face except the face that stroke simulator SS and motor 50 are mounted, is effective for enhancing the manufacturing efficiency.

(iv) In the brake control apparatus, the second switching valve (S1) is mounted on a point of the second lateral face (H102) where the fluid accommodating section (SS) is orthogonally projected on the second lateral face. It is supposed here that stroke simulator shut-off valve S1 is arranged far from stroke simulator SS. Under low temperature conditions, the viscosity of brake fluid is low so that the piston movement of stroke simulator SS shows a delayed response with respect to operation of stroke simulator shut-off valve S1. It is possible that this delay of response provides an uncomfortable feel to driver's depressing operation. On the other hand, in the first embodiment, the arrangement where stroke simulator shut-off valve S1 is disposed close to stroke simulator SS, is effective for minimizing the hydraulic loss or delay due to fluid passage length, and also for minimizing uncomfortable feel to driver's brake pedal stroke.

(v) In the brake control apparatus, the branch fluid passage (32a) and the fluid accommodating section (SS) are arranged on a side of a rotation axis (G1) of the motor (50) closer to the first port set (H11, H12). This arrangement is effective for minimizing the fluid passage through which the brake fluid supplied from master cylinder 3 to hydraulic brake unit HU is supplied to stroke simulator SS, and is effective for minimizing the hydraulic loss or delay due to fluid passage length similarly as the above effect (d).

(vi) In the brake control apparatus, the fluid accommodating section (SS) is arranged in a position that is above the motor (50) when the brake control apparatus is mounted on the vehicle, the brake unit (HU) further comprises an insulator (ISU) adapted to be secured to the vehicle, and the insulator (ISU) is mounted in a position that is in a lower portion of the brake unit (HU) when the brake control apparatus is mounted on the vehicle. In general, a motor is one of heaviest components in a brake control apparatus. Accordingly, the arrangement where the motor is disposed in a lower portion of hydraulic brake unit HU, is effective for lowering the center of gravity of the whole construction of hydraulic brake unit HU. This is effective for enhancing the mountability of the brake control apparatus, and for stabilizing the weight balance of the vehicle. In case hydraulic brake unit HU includes a plurality of ports for brake fluid lines, the arrangement where stroke simulator SS is disposed close to the ports, is effective for minimizing the hydraulic loss due to fluid passage length.

Figure 9:
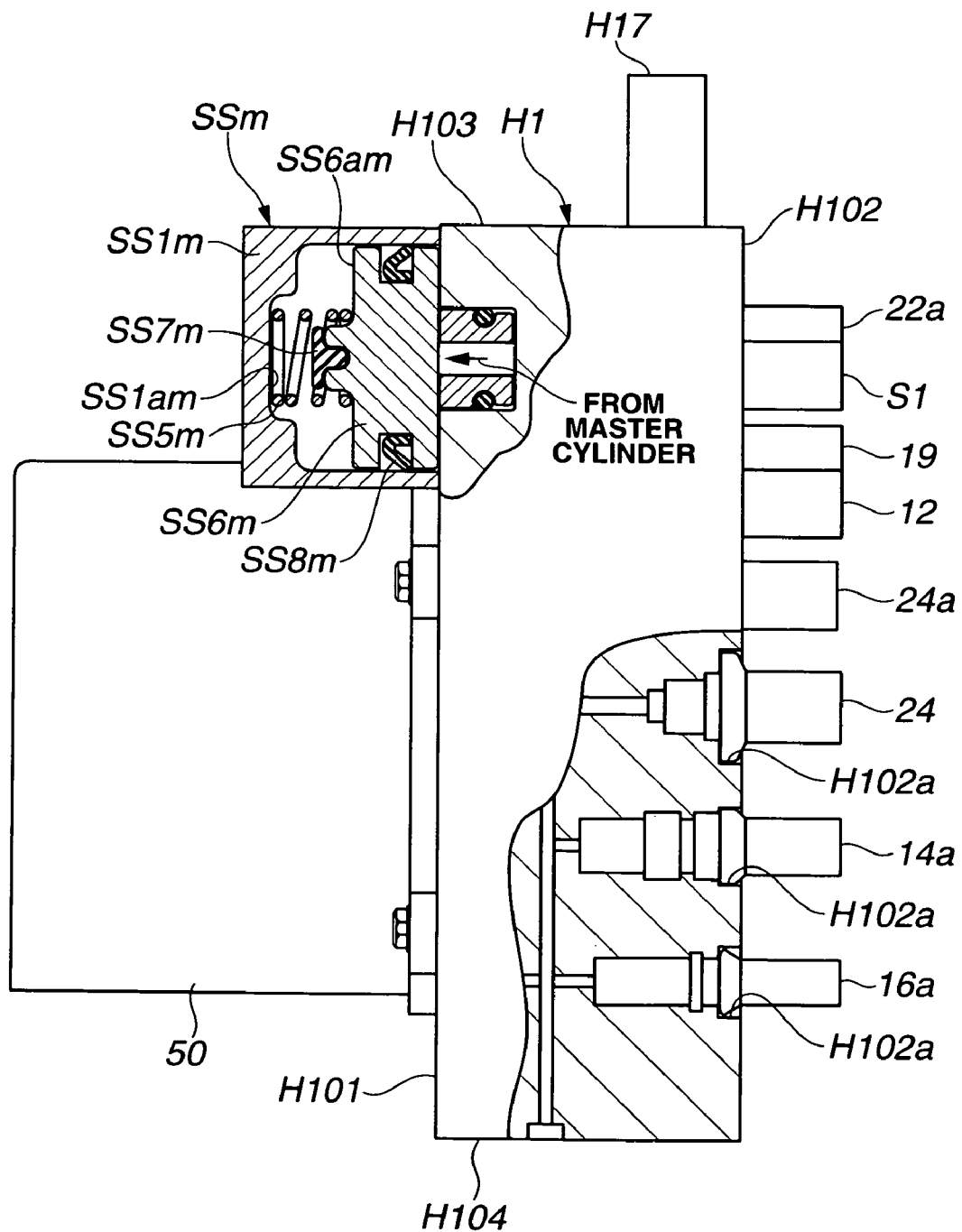
FIG. 9 is a cutaway side view of a hydraulic brake unit of a brake control apparatus in accordance with a second embodiment.

The following describes a brake control apparatus in accordance with a second embodiment with reference to FIG. 9. FIG. 9 is a cutaway side view of a hydraulic brake unit of the brake control apparatus of the second embodiment. The brake control apparatus of the second embodiment is basically configured as in the first embodiment. As shown in FIG. 9, stroke simulator SS of the first embodiment is replaced with a stroke simulator SSm. Although stroke simulator SS comprises a plurality of springs and elastic components such as rubbers to simulate a characteristic of pedal depressing force with respect to brake pedal operation in the first embodiment, the characteristic of pedal depressing force is simulated by electronically and continuously controlling the opening of stroke simulator shut-off valve S1 in the second embodiment. Stroke simulator SSm comprises an outer tube SS1$m$, a coil spring SS5$m$, a piston SS6$m$, a rubber member SS7$m$, and a sealing member SS8$m$. Outer tube SS1$m$ is cylindrically formed, having a closed end SS1$am$ and an open end secured to first unit H1. Coil spring SS5$m$ is disposed between bottom face SS1$am$ of outer tube SS1$m$ and a flange portion SS6$am$ of piston SS6$m$. Rubber member SS7$m$ is secured to the tip of piston SS6$m$. Sealing member SS8$m$ is retained in an outer peripheral groove of piston SS6$m$ and is in sliding contact with the inner face of outer tube SS1$m$, serving to seal therebetween.

In the second embodiment, stroke simulator shut-off valve control section CU22 computes a desired characteristic of pedal depressing force in accordance with the sensor signals, computes the opening degree of stroke simulator shut-off valve S1 in accordance with the desired characteristic, and issues and outputs a corresponding command signal. As shown in FIG. 9, stroke simulator SS is formed having a minimum volumetric capacity to store a necessary amount of brake fluid. This arrangement is effective for enhancing compactness of stroke simulator SS.

The pedal depressing force characteristic may be changed in accordance with a driving state of the vehicle. If a stroke simulator is disposed close to a master cylinder outside a hydraulic brake unit, cooperative control of a BBW system is implemented by providing communication lines between the stroke simulator and the hydraulic brake unit or providing an additional controller for the stroke simulator which is disposed on the CAN communication line. Under condition that the above communication uses a wide part of the capacity of the CAN communication line, it is possible that the cycle period of the brake control computing cannot be reduced short enough due to the restriction of the bus load of the CAN communication. Accordingly, it is possible that this slow communication speed adversely affects the control performance and thereby adversely affects the braking feel. In contrast, in the second embodiment, stroke simulator shut-off valve S1 is disposed close to the electromagnetic valves for wheel cylinder pressures. This arrangement needs no wiring for the cooperative control of the BBW system and no additional controller, and provides a stable braking feel. When a malfunction occurs in the BBW system, stroke simulator shut-off valve S1 is shut off to provide a general manual braking system.

Figure 10:
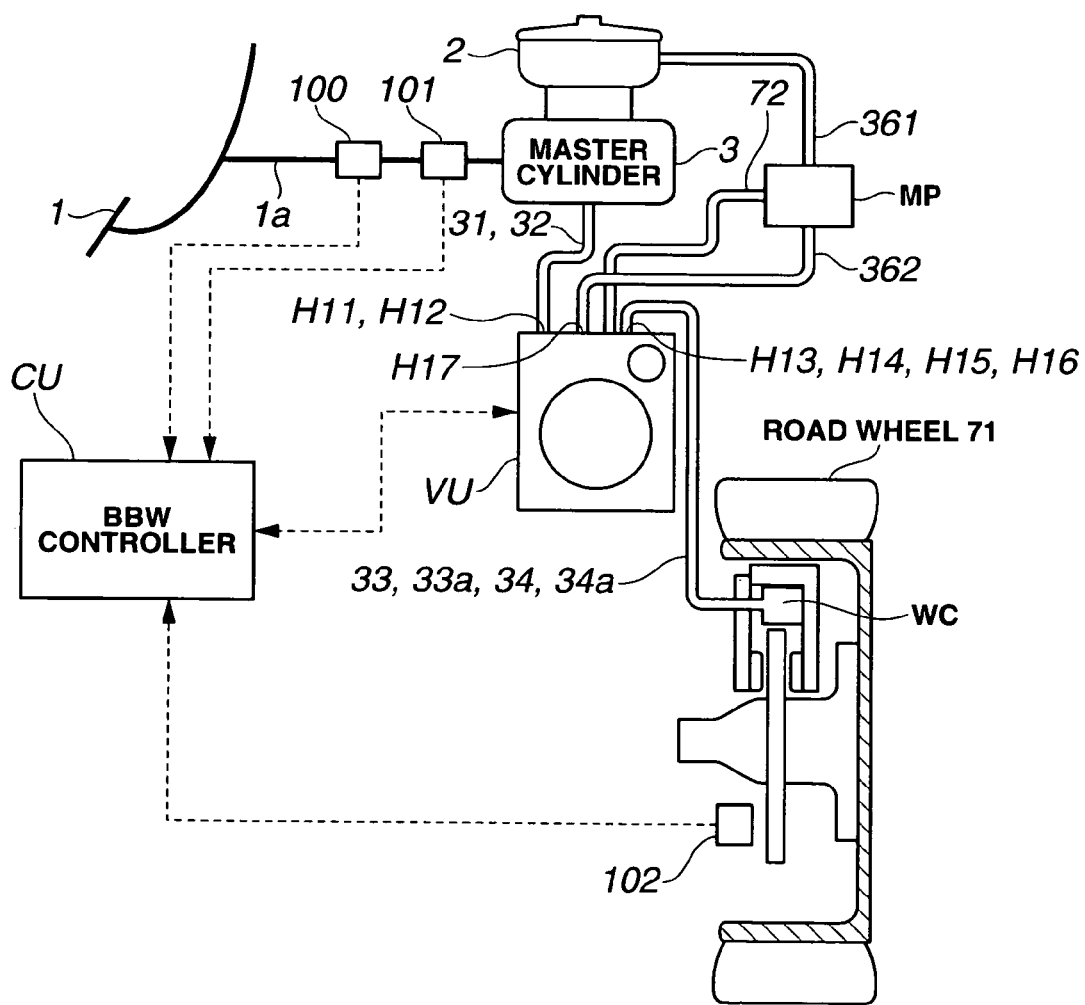
FIG. 10 is a schematic diagram showing system configuration of a BBW system with a brake control apparatus in accordance with a third embodiment.

The following describes a brake control apparatus in accordance with a third embodiment with reference to FIG. 10. FIG. 10 is a schematic diagram showing system configuration of a BBW system with the brake control apparatus of the third embodiment. The brake control apparatus of the third embodiment is basically configured as in the first embodiment. As shown in FIG. 10, the brake control apparatus includes a main pump MP which is operative to provide a fluid pressure during normal operating conditions, and a valve unit VU. Valve unit VU is configured similarly as hydraulic brake unit HU of the first and second embodiments, including the pump, motor, and electromagnetic valves. Main pump MP comprises a motor and a pump driven by the motor. Main pump MP is connected to fluid reservoir tank 2 via a fluid passage 361, and to valve unit VU via fluid passages 72 and 362. The fluid passage 362 is connected to third port set H17. Thus, the brake fluid is supplied to valve unit VU via fluid passage 72 and is discharged from valve unit VU via fluid passages 361 and 362. The pump of valve unit VU serves as a sub pump. In this construction, the arrangement where stroke simulator SS is installed in valve unit VU including valves such as stroke simulator shut-off valve S1, is also effective for enhancing the mountability of the brake control apparatus and the flexibility of engine room layout.

Figure 11:
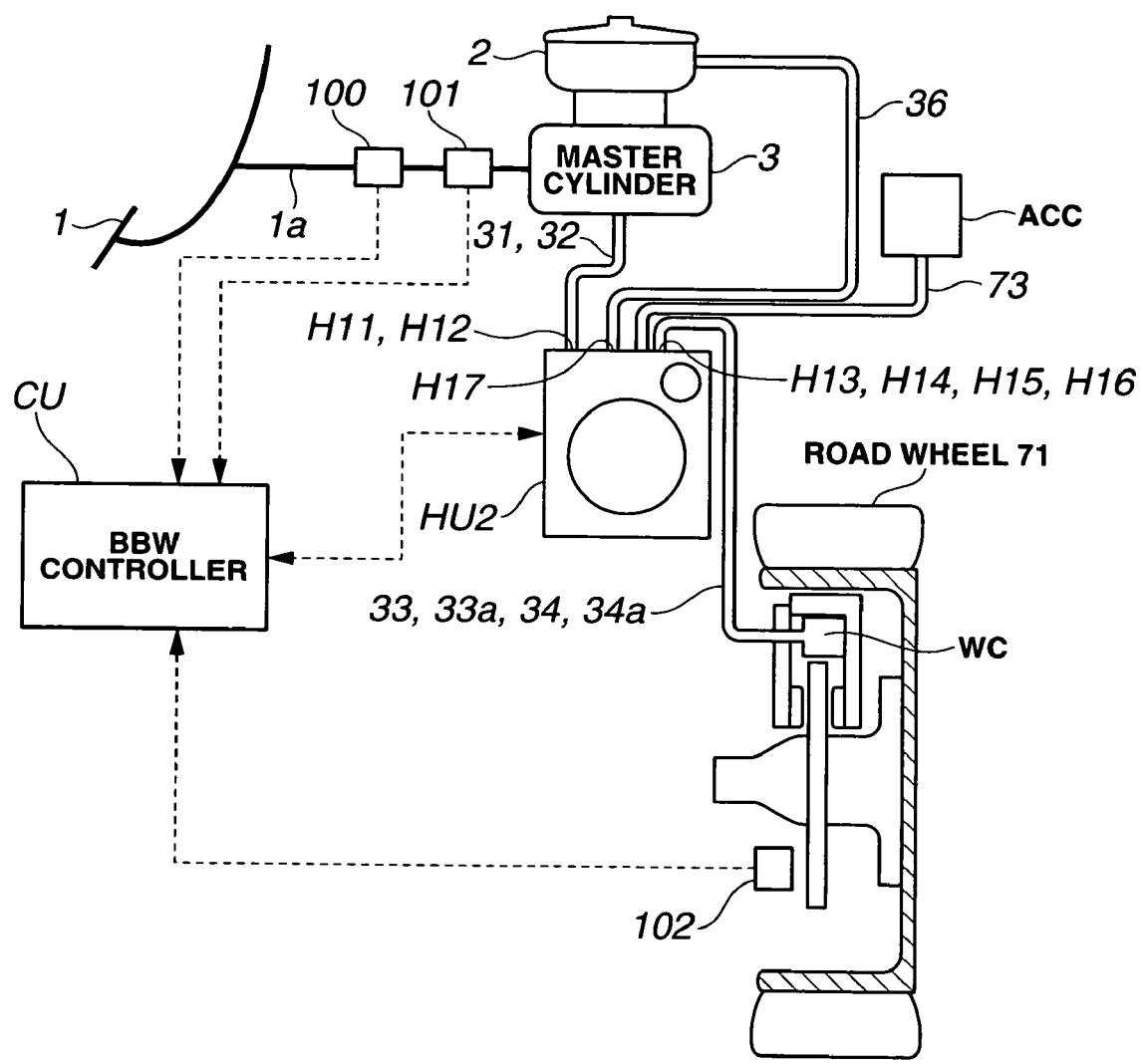
FIG. 11 is a schematic diagram showing system configuration of a BBW system with a brake control apparatus in accordance with a fourth embodiment.

The following describes a brake control apparatus in accordance with a fourth embodiment with reference to FIG. 11. FIG. 11 is a schematic diagram showing system configuration of a BBW system with the brake control apparatus of the fourth embodiment. The brake control apparatus of the fourth embodiment is basically configured as in the first embodiment. As shown in FIG. 11, the brake control apparatus of the fourth embodiment further includes an accumulator ACC. A hydraulic brake unit HU2 is configured similarly as hydraulic brake unit HU of the first and second embodiments except an additional port. Accumulator ACC is provided independently of hydraulic brake unit HU2, and is connected to hydraulic brake unit HU2 via a fluid passage 73 to store a fluid pressure produced by the pump of hydraulic brake unit HU2 and to supply the fluid pressure. In this construction, the arrangement where stroke simulator SS is installed in hydraulic brake unit HU2 including valves such as stroke simulator shut-off valve S1, is also effective for enhancing the mountability of the brake control apparatus and the flexibility of engine room layout.

This application is based on a prior Japanese is Patent Application No. 2005-208044 filed on Jul. 19, 2005. The entire contents of this Japanese Patent Application No. 2005-208044 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A brake control apparatus comprising:
   a stroke simulator;
   a motor for driving a pump for fluid pressure supply to a wheel cylinder set;
   a brake unit comprising a block including a first lateral face where the stroke simulator and the motor are mounted, the brake unit including:
      a first port set configured to be hydraulically connected to a master cylinder via a first fluid line set, and
      a second port set configured to be hydraulically connected to the wheel cylinder set via a second fluid line set; and
   a branch fluid passage leading to the stroke simulator and containing a switch valve,
   wherein the branch fluid passage and the switch valve are arranged in the block;
   wherein the stroke simulator includes a plurality of portions each defining a bolt hole arranged around its periphery, and wherein the stroke simulator is bolted to the first lateral face in such a manner that at least one of the plurality of portions each defining a bolt hole is located in a corner portion of the first lateral face.

2. A brake control apparatus comprising:
a brake unit adapted to be arranged in a brake line system, the brake unit comprising:
a first port set adapted to be hydraulically connected to an upstream portion of the brake line system via a first fluid line set, wherein the upstream portion is provided with a master cylinder;
a second port set hydraulically connected to a downstream portion of the brake line system via a second fluid line set;
a first fluid passage hydraulically connecting the first port set to the second port set;
a first switching valve arranged to vary a state of fluid communication through the first fluid passage;
a motor configured to drive a pump for fluid pressure supply to a portion of the first fluid passage between the first switching valve and the second port set;
a stroke simulator adapted to accommodate a variable amount of brake fluid;
a branch fluid passage hydraulically connecting the first port set to the stroke simulator; and
a second switching valve arranged to vary a state of fluid communication through the branch fluid passage, wherein the brake unit comprises a block including a first lateral face where the motor and the stroke simulator are mounted, and wherein the branch fluid passage and the second switching valve are arranged in the block; and
a controller electrically connected to the first switching valve, the second switching valve, and the pump, and configured to control the first switching valve, the second switching valve, and the pump in accordance with a state of a brake operating device;
wherein the stroke simulator includes a plurality of portions each defining a bolt hole arranged around its periphery, and wherein the stroke simulator is bolted to the first lateral face in such a manner that at least one of the plurality of portions each defining a bolt hole is located in a corner portion of the first lateral face.

3. The brake control apparatus as claimed in claim 2, wherein the motor includes a plurality of portions each defining a bolt hole arranged around its periphery, and wherein the motor is bolted to the first lateral face in such a manner that the plurality of portions each defining a bolt hole are located away from a periphery of the stroke simulator.

4. A brake control apparatus comprising:
a stroke simulator;
a motor for driving a pump for fluid pressure supply to a wheel cylinder set;
a brake unit comprising a block including a first lateral face where the stroke simulator and the motor are mounted;
a first fluid line set hydraulically connecting a master cylinder to the brake unit; and
a second fluid line set hydraulically connecting the wheel cylinder set to the brake unit,
wherein the stroke simulator includes a plurality of portions each defining a bolt hole arranged around its periphery, and wherein the stroke simulator is bolted to the first lateral face in such a manner that at least one of the plurality of portions each defining a bolt hole is located in a corner portion of the first lateral face.

5. A brake control apparatus comprising:
a brake unit configured to be arranged in a brake line system, the brake unit comprising:
a first port set configured to be hydraulically connected to an upstream portion of the brake line system via a first fluid line set, wherein the upstream portion is provided with a master cylinder;
a second port set hydraulically connected to a downstream portion of the brake line system via a second fluid line set;
a first fluid passage hydraulically connecting the first port set to the second port set;
a first switching valve configured to vary a state of fluid communication through the first fluid passage;
a motor configured to drive a pump for fluid pressure supply to a portion of the first fluid passage between the first switching valve and the second port set;
a stroke simulator configured to accommodate a variable amount of brake fluid;
a branch fluid passage hydraulically connecting the first port set to the stroke simulator; and
a second switching valve configured to vary a state of fluid communication through the branch fluid passage, wherein the brake unit comprises a block including a first lateral face where the motor and the stroke simulator are mounted; and
a controller electrically connected to the first switching valve, the second switching valve, and the pump, and configured to control the first switching valve, the second switching valve, and the pump in accordance with a state of a brake operating device;
wherein the stroke simulator includes a plurality of portions each defining a bolt hole arranged around its periphery, and wherein the stroke simulator is bolted to the first lateral face in such a manner that at least one of the plurality of portions each defining a bolt hole is located in a corner portion of the first lateral face.

* * * * *